United States Patent
Yi et al.

(10) Patent No.: US 9,066,243 B2
(45) Date of Patent: *Jun. 23, 2015

(54) APPARATUS AND METHOD OF MANAGING RADIO BEARER IN WIRELESS COMMUNICATION SYSTEM

(71) Applicant: LG ELECTRONICS INC., Seoul (KR)

(72) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/201,463

(22) Filed: Mar. 7, 2014

(65) Prior Publication Data

US 2014/0185517 A1 Jul. 3, 2014

Related U.S. Application Data

(63) Continuation of application No. 13/556,473, filed on Jul. 24, 2012, now Pat. No. 8,711,799, which is a continuation of application No. 12/763,536, filed on Apr. 20, 2010, now Pat. No. 8,270,361.

(60) Provisional application No. 61/171,440, filed on Apr. 21, 2009, provisional application No. 61/172,193, filed on Apr. 23, 2009.

(30) Foreign Application Priority Data

Apr. 1, 2010 (KR) ........................ 10-2010-0029953

(51) Int. Cl.
*H04W 16/26* (2009.01)
*H04W 72/00* (2009.01)
(Continued)

(52) U.S. Cl.
CPC ............ *H04W 16/26* (2013.01); *H04W 72/087* (2013.01); *H04B 7/15* (2013.01)

(58) Field of Classification Search
None
See application file for complete search history.

(56) References Cited

U.S. PATENT DOCUMENTS

| 7,397,824 B2 | 7/2008 | Okubo |
| 2007/0258433 A1 | 11/2007 | Speight |

(Continued)

FOREIGN PATENT DOCUMENTS

| CN | 1627785 A | 6/2005 |
| CN | 1633188 A | 6/2005 |

(Continued)

OTHER PUBLICATIONS

Huawei, "State Transition from Enhanced CELL_FACH to CELL_DCH State." 6.4.3; 3GPP TSG-RAN WG2 Meeting #61bis; R2-081653; Shenzhen, China Mar. 31-Apr. 4, 2008; pp. 1-4.

(Continued)

*Primary Examiner* — Alex Skripnikov
(74) *Attorney, Agent, or Firm* — McKenna Long & Aldridge LLP

(57) ABSTRACT

A method and apparatus of managing a radio bearer is disclosed. A relay node (RN) sets up at least one UuRB for a Uu interface between a user equipment (UE) and the RN and a UnRB for a Un interface between the RN and a base station (BS). The at least one UuRB is mapped to the UnRB according to quality of service (QoS) guaranteed by the at least one UuRB to setup a RB between the UE and the BS.

10 Claims, 17 Drawing Sheets

(51) Int. Cl.
*H04W 72/08* (2009.01)
*H04B 7/15* (2006.01)

(56) References Cited

U.S. PATENT DOCUMENTS

| 2010/0103862 | A1 | 4/2010 | Ulupinar et al. | |
|---|---|---|---|---|
| 2010/0103863 | A1* | 4/2010 | Ulupinar et al. | 370/315 |
| 2010/0260129 | A1* | 10/2010 | Ulupinar et al. | 370/329 |

FOREIGN PATENT DOCUMENTS

| CN | 1938969 A | 3/2007 |
|---|---|---|
| CN | 101039503 A | 9/2007 |
| JP | 2007-143138 | 6/2007 |
| KR | 10-2006-0134798 | 12/2006 |
| KR | 10-2008-0098651 | 11/2008 |
| WO | 2006/007582 A1 | 7/2006 |

OTHER PUBLICATIONS

R2-071434 3GPP TSG-RAN WG 2 meeting #57-bis St. Julians, Mala, Mar. 26-30, 2007, QUALCOMM Europe, "Analysis on Uu interface aspect for Enhanced SRNS relocation for the HSPA Evolution".

R2-081653 3GPP TSG-RAN WG2 meeting #61bis Shenzhen, China, Mar. 31-Apr. 4, 2008, Huawei, "State transisition from enhanced CELL__FACH to CELL__DCH state".

Huawei, "State Transition from enhanced CELL__FACH to CELL__DCH state", 3GPP TSF-RAN #61 bis, R2-081653, Mar. 31-Apr. 4, 2008, Shenzhen, China.

QUALCOMM Europe, "Analysis on Uu interface aspect for Enhanced SRNS relocation for the HSPA Evolution", 3GPP TSG-RAN #57 bis, R2-071434, Mar. 26-30, 2007, St. Julians, Malta.

Ulupinar et al., U.S. Appl. No. 61/108,287, Oct. 24, 2008, pp. 1-63.

* cited by examiner

APPARATUS AND METHOD OF MANAGING RADIO BEARER IN WIRELESS COMMUNICATION SYSTEM

CROSS-REFERENCE TO RELATED APPLICATIONS

This application is a continuation of, and claims the benefit of, U.S. application Ser. No. 13/556,473 filed on Jul. 24, 2012, which is a continuation of U.S. application Ser. No. 12/763,536, filed on Apr. 20, 2010 (now U.S. Pat. No. 8,270,361, issued Sep. 18, 2012), and claims the benefit of priority of U.S. Provisional applications 61/171,440 filed on Apr. 21, 2009, 61/172,193 filed on Apr. 23, 2009, and Korean Patent Application No. 10-2010-0029953 filed on Apr. 1, 2010, all of which are incorporated by reference in their entirety herein.

BACKGROUND OF THE INVENTION

1. Field of the Invention

The present invention relates to wireless communication, and more particularly, to an apparatus and method of managing a radio bearer in a wireless communication system.

2. Related Art

The 3rd generation partnership project (3GPP) long term evolution (LTE) which is a set of enhancements to the Universal Mobile Telecommunications System (UMTS) has been introduced as 3GPP release 8. The 3GPP LTE uses an orthogonal frequency division multiple access (OFDMA) in a downlink and uses a single carrier-frequency division multiple access (SC-FDMA) in an uplink. The 3GPP LTE adopts multiple input multiple output (MIMO) having maximum four antennas. Research is now underway on 3GPP LTE-Advanced (LTE-A), which is a major enhancement to 3GPP LTE.

As a representative technology newly added in the LTE-A system, there are carrier aggregation and a relay. The carrier aggregation is used to flexibly expand an available bandwidth. The relay increases coverage of a cell, supports group mobility, and allows a user-centered network arrangement.

A radio bearer means a logical path provided by a radio interface protocol for transmitting data between user equipment and a network through a wireless channel.

The radio bearer is used to be defined only for the wireless channel between the user equipment and a base station. However, as the relay is introduced, two wireless channels, that is, a first wireless channel between the user equipment and the relay, and a second wireless channel between the base station and the relay, exists and the radio bearer for the two wireless channels needs to be defined.

SUMMARY OF THE INVENTION

The present invention provides a method and apparatus of managing a radio bearer in a wireless communication system.

The present invention also provides a method and apparatus for mapping a radio bearer between a relay node and a base station in a wireless communication system.

In an aspect, a method of managing a radio bearer (RB) in a wireless communication system is provided. The method includes setting up, at a relay node (RN), at least one UuRB for a Uu interface between a user equipment (UE) and the RN, and setting up, at the RN, a UnRB for a Un interface between the RN and a base station (BS), wherein the at least one UuRB is mapped to the UnRB according to quality of service (QoS) guaranteed by the at least one UuRB to setup a RB between the UE and the BS.

A plurality of UuRBs may be setup between a plurality of UEs and the RB, and at least one UuRBs having same guaranteed QoS among the plurality of UuRBs may be mapped to the UnRB.

A plurality of UnRBs may be setup between the RN and the BS, and at least one UuRB having different guaranteed QoSs among the plurality of UuRBs may be mapped to different UnRB.

A data packet transmitted through the UnRB may include identification information identifying the UE to which the at least one UuRB is setup and the at least one UuRB mapped to the UnRB.

The identification information may represent an identifier of the at least one UuRB mapped to the UnRB and an identifier of the UE to which the at least one UuRB is setup.

The identification information may represent an unique identifier identifying the at least one UuRB mapped to the UnRB and the UE to which the at least one UuRB is setup.

The identification information may be included at one of a packet data convergence protocol (PDCP) layer, a radio link control (RLC) layer, and an upper entity of the PDCP layer.

In another aspect, a relay node includes a radio bearer (RB) managing unit configured to manage a RB, and an interface unit configured to provide a first interface to a user equipment (UE) and provide a second interface to a base station (BS), wherein the RB managing unit is configured to set up at least one UuRB for the first interface with the UE, set up a UnRB for the second interface with the BS, and map the at least one UuRB to the UnRB according to quality of service (QoS) guaranteed by the at least one UuRB to setup a RB between the UE and the BS.

In still another aspect, a user equipment includes an interface unit configured to provide a Uu interface to a relay node (RN), and a radio bearer (RB) managing unit configured to set up at least one UuRB for the the Un interface with the RN, wherein the RN sets up a UnRB for a Un interface with a base station (BS), and the at least one UuRB is mapped to the UnRB according to quality of service (QoS) guaranteed by the at least one UuRB to setup a RB between the UE and the BS.

The architecture of the bearer service according to the introduction of the relay node (RN) is proposed. The mapping between a UnRB used in a Un interface of the RN-BS and a UnRB used in a Uu interface of the RN-UE is proposed. The UnRB can be efficiently mapped to the UuRB and the S1 bearer.

DESCRIPTION OF EXEMPLARY EMBODIMENTS

Figure 1:
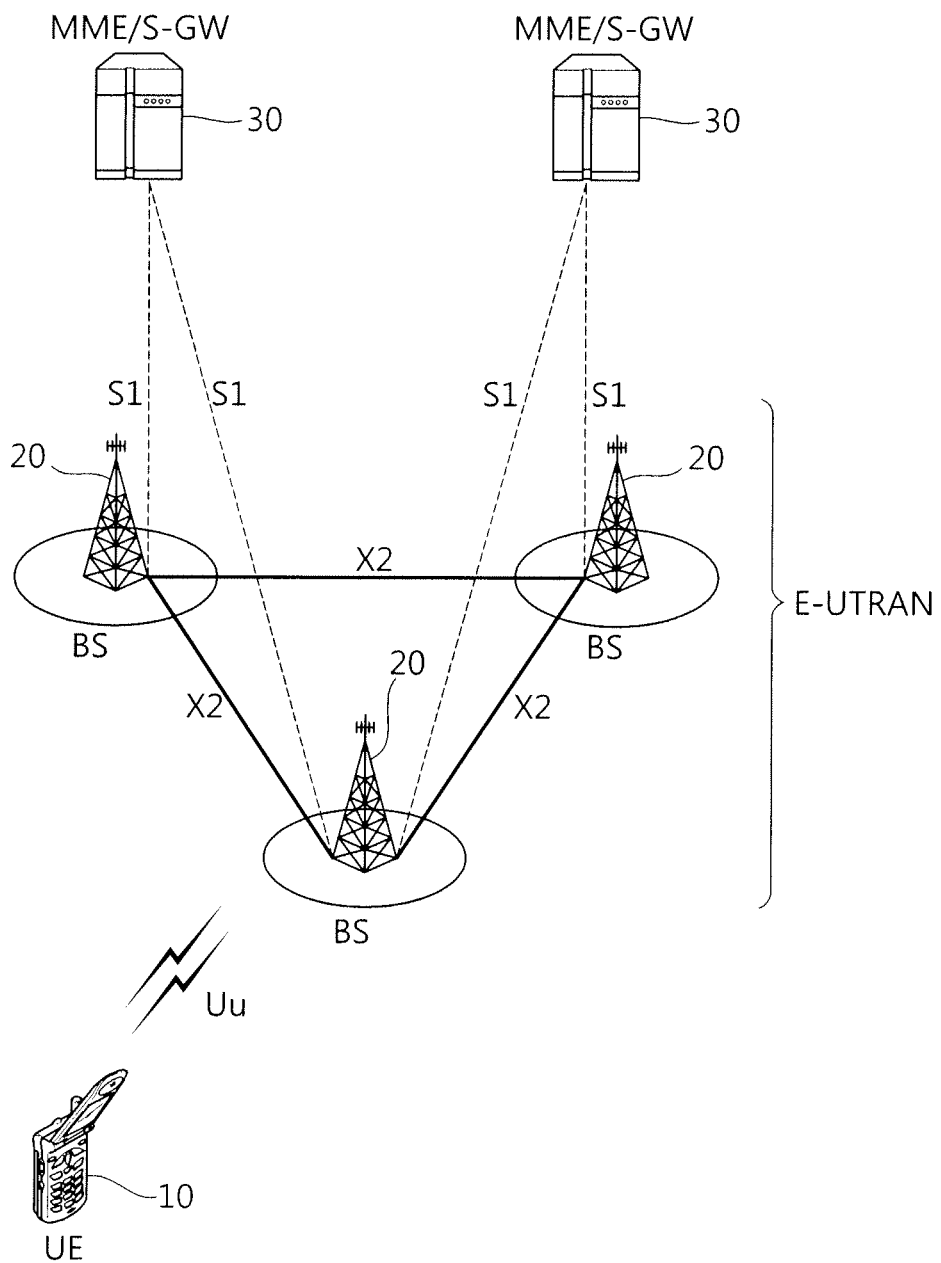
FIG. 1 is a diagram showing a wireless communication system to which the present invention is applied.

FIG. 1 is a diagram showing a wireless communication system to which the present invention is applied. This can be called an Evolved-UMTS Terrestrial Radio Access Network (E-UTRAN) or a Long Term Evolution (LTE)/LTE-A system.

The E-UTRAN includes base stations (BSs) 20 that provide a control plane and a user plane to user equipment (UE). The user equipment 10 may be fixed or moved and may be called as other terms such as a mobile station (MS), a user terminal (UT), a subscriber station (SS), a mobile terminal (MT), a wireless device, etc. The BS 20 means a fixed station that communicates with the user equipment 10 and may be called as other terms such as an evolved-NodeB (eNB), a base transceiver system (BTS), an access point, etc.

The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U.

The EPC 30 is configured to include the MME, the S-GW, and a packet data network-gateway (P-GW). The MME has access information on the UE or information on the capability of the UE. This information is mainly used for the mobility management of the UE. The S-GW is a gateway having E-UTRAN as an endpoint and the P-GW is a gateway having the PDN as an endpoint.

A radio interface between the UE and the BS is called a Uu interface. Layers of a radio interface protocol between the user equipment and the network may be divided into an L1 (first layer), an L2 (second layer), and an L3 (third layer) based on three lower layers of an open system interconnection (OSI) standard model that is widely known in a communication system. A physical layer belonging to the first layer provides an information transfer service using a physical channel and a radio resource control (RRC) layer belonging to the third layer serves to control radio resources between the user equipment and the network. To this end, the RRC layer exchanges the RRC messages between the user equipment and the base stations.

Figure 2:
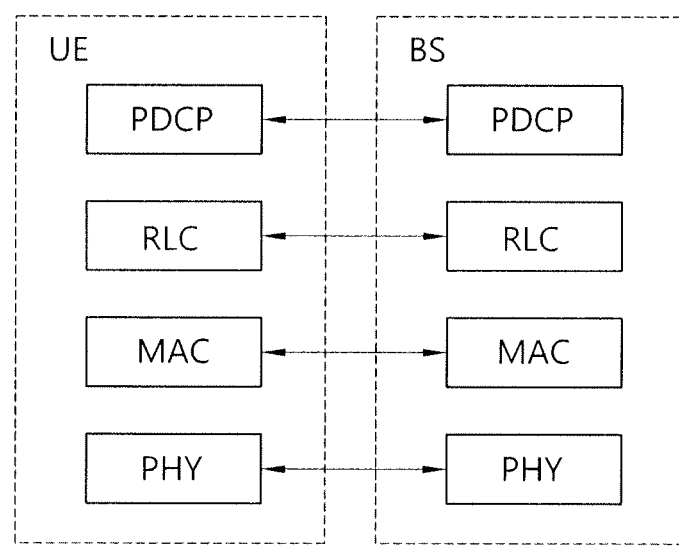
FIG. 2 is a block diagram showing radio protocol architecture for a user plane.
Figure 3:
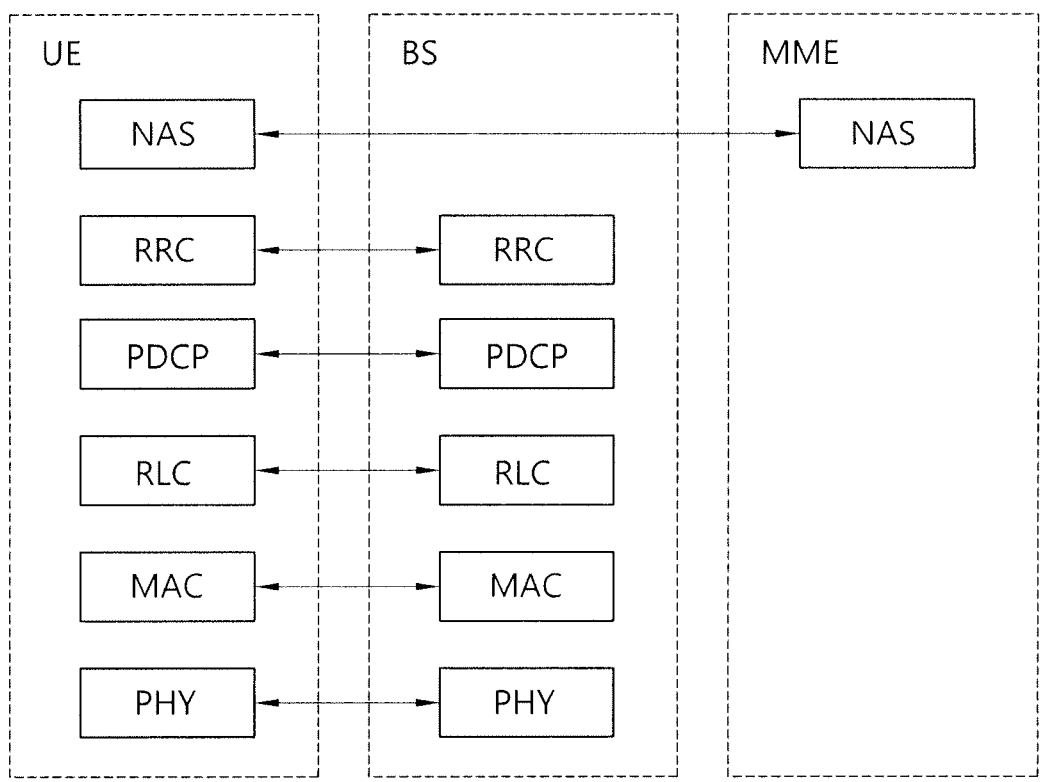
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for transmitting user data and the control plane is a protocol stack for transmitting the control signal.

Referring to FIGS. 2 and 3, the physical (PHY) layer provides the information transfer service to an upper layer using the physical channel. The PHY layer is connected with the upper layer, i.e. a medium access control (MAC) layer, through a transport channel. Data are exchanged between the MAC layer and the physical layer through the transport channel. Transport channels are classified by how and with what characteristics data are transferred over the radio interface.

Between different physical layers, i.e., the physical layer of a transmitter and the physical layer of a receiver, data are transferred through the physical channel. The physical channel may be modulated by using an orthogonal frequency division multiplexing (OFDM) scheme and may use time and frequency as radio resources.

The functions of the MAC layer include the mapping between logical channels and transport channels, and the multiplexing/demultiplexing of MAC service data units (SDUs) belonging to one or different logical channels into/from transport blocks delivered to/from the PHY layer on the transport channels. The MAC layer provides services to a radio link control (RLC) layer through the logical channel.

The functions of the RLC layer include concatenation, segmentation, and reassembly of RLC SDUs. In order to guarantee various quality of services (QoSs) required by radio bearers (RBs), the RLC layer provides three operation modes: a transparent mode (TM), a unacknowledged mode (UM), and an acknowledged mode (AM). The AM RLC provides error correction through an automatic repeat request (ARQ).

The functions of the packet data convergence protocol (PDCP) layer at the user plane include transfer of user data, header compression/decompression, and ciphering/deciphering. The functions of the packet data convergence protocol (PDCP) layer at the control plane include transfer of control plane data, and ciphering and integrity protection.

A radio resource control (RRC) layer is defined only in the control plane. The RRC layer serves to control the logical channels, the transport channels and the physical channels in association with configuration, reconfiguration and release of radio bearers (RBs).

The RB means a logical path provided by the first layer (i.e. PHY layer) and the second layers (i.e. MAC layer, RLC layer, PDCP layer) for data transmission between a UE and a network. Configuring the RB means a process of defining radio protocol layers and characteristics of channels to provide a service and defining specific parameters and operation schemes. The RB may be classified into a signaling RB (SRB) and a data RB (DRB). The SRB is used as a path to transfer RRC messages at the control plane and the DRB is used as a path to transfer the user data at the user plane.

A non-access stratum (NAS) layer belonging to the upper layer of the RRC layer serves to perform session management and mobility management.

When RRC connection is made between the RRC layer of the UE and the RRC layer of the E-UTRAN, the UE is in an RRC connected state. Otherwise, the UE is in an RRC idle state.

Figure 4:
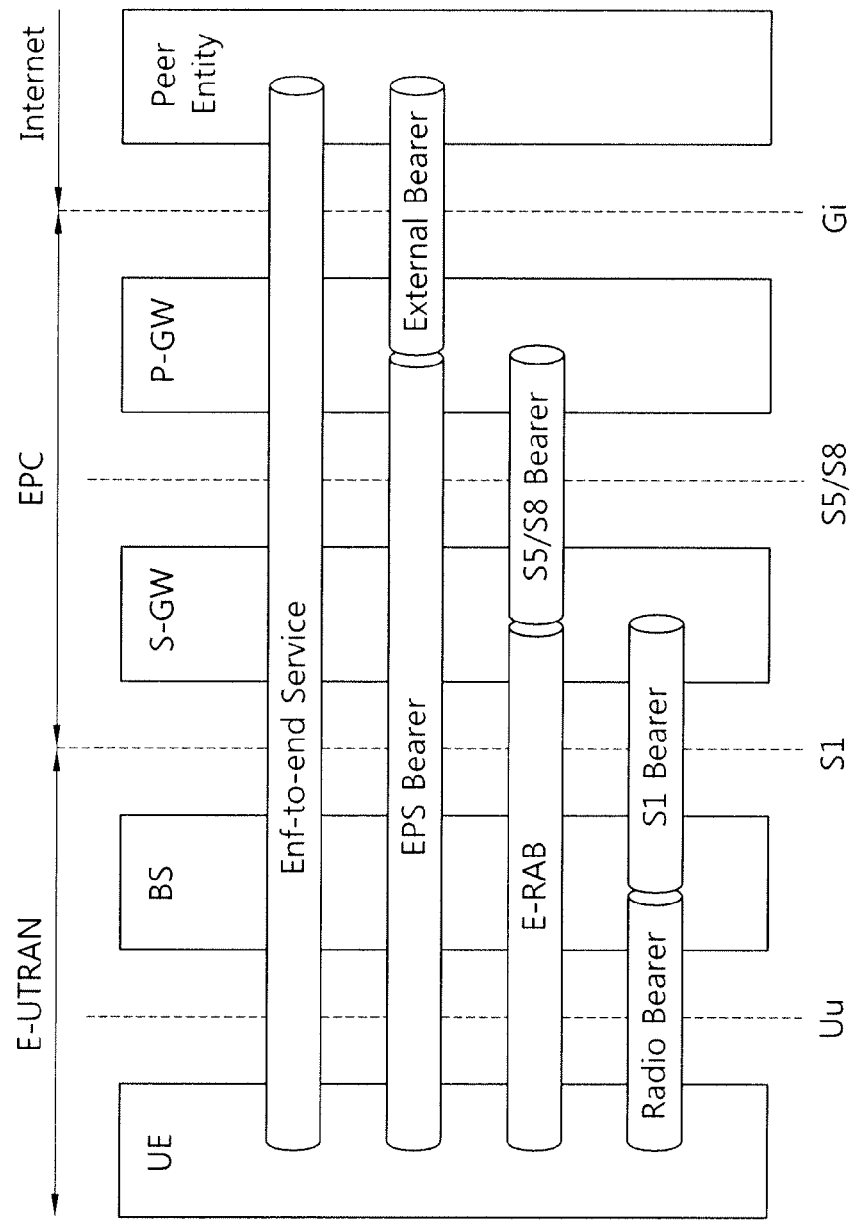
FIG. 4 is a diagram showing architecture of a bearer service in 3GPP LTE.

FIG. 4 is a diagram showing architecture of a bearer service in 3GPP LTE. The RB is a bearer provided via a Uu interface in order to support the user services. In the 3GPP LTE, each bearer is defined for each interface in order to guarantee independence between the interfaces.

The bearers provided by the 3GPP LTE system is generally called as evolved packet system (EPS) bearers. The EPS bearers are divided into the radio bearer (RB), the S1 bearer, etc. for each interface.

The packet gateway (P-GW) is a network node that connects between the LTE network and other networks. The EPS bearer is defined between a UE and the P-GW. The EPS bearer is more subdivided between respective nodes, such that it is defined as the RB between a UE and a BS, as the S1 bearer between the BS and the S-GW, and as the S5/S8 bearer between the S-GW and the P-GW within the EPC.

The long term evolution-advanced (LTE-A) system is a system developed to meet the LTE system to fourth-generation mobile communication conditions which is IMT-Advanced conditions recommended in an international telecommunication union-radio communication sector (ITU-R). In the 3GPP developing the LTE system standard, the LTE-A system standard development is now in progress.

As a representative technology newly added in the LTE-A system, there are carrier aggregation and a relay. The carrier aggregation is used to flexibly expand an available bandwidth. The relay increases the coverage of a cell, supports group mobility, and allows a user-centered network arrangement.

Figure 5:
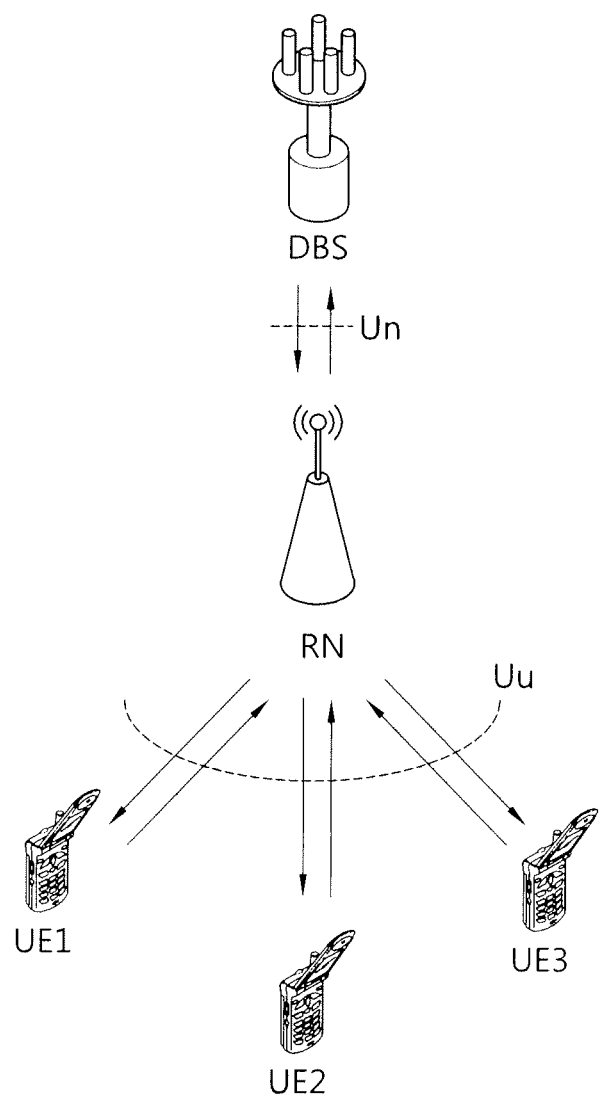
FIG. 5 is a diagram showing a network system supporting a relay.

FIG. 5 is a diagram showing a network system supporting the relay. The relay relays data between the UE and the BS. A network node that performs functions of the relay is called as a relay node (RN). The BS that manages one or more RN is called a donor BS (DBS).

The radio interface between the UE and the RN is called a Uu interface and the radio interface between the RN and the DBS is called an Un interface. A link between the UE and the RN is called an access link, and a link between the RN and the DBS is called a backhaul link.

The RN manages the UE on behalf of the DBS. The UE can transparently receive services from the DBS through the RN. This means that it is not necessarily for the UE to know whether services are provided by the DBS through the RN or whether services are directly provided by the DBS. Therefore, the Uu interface between the UE and the RN can utilize the Uu interface protocol used by the 3GPP LTE almost as it is.

In terms of the DBS, the RN can access to the DBS as a UE or a BS of the UE. For example, when the RN initially accesses to the DBS, the DBS does not know whether the RN attempts to access the DBS. Initially, the RN can attempt to access to the DBS through a conventional random access process, similar to other UEs. After the RN completes the access of the DBS, the RN is operated like the BS that manages the UE connected thereto.

Therefore, it is necessary that functions of Un interface protocol includes functions of the network protocol as well as functions of the Uu interface protocol. In the current 3GPP, whether any function in each protocol layer is added or changed based on the Uu interface protocol such as the MAC/RLC/PDCP/RRC layers for the Un interface protocol is under discussion.

Figure 6:
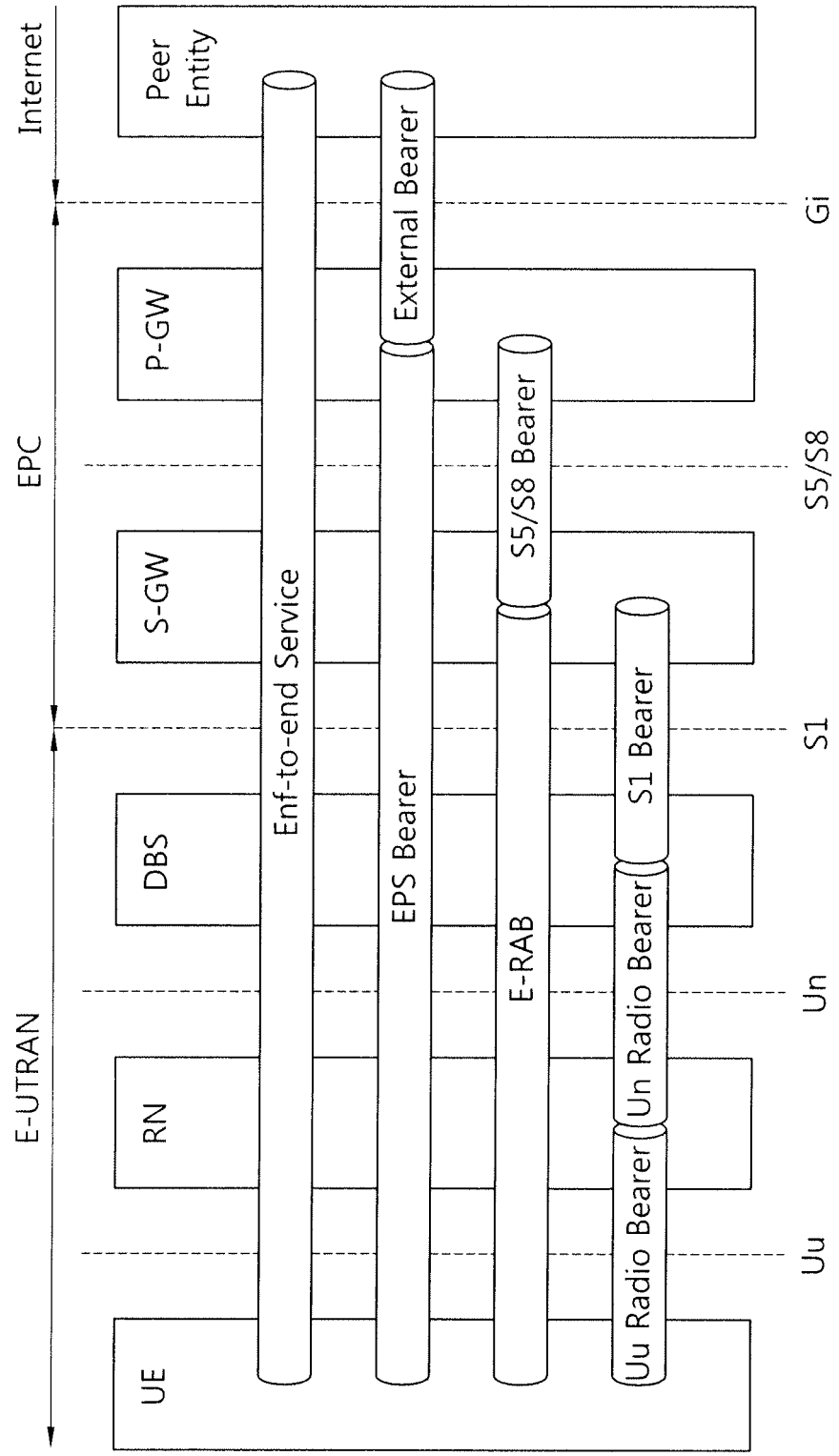
FIG. 6 is one example of the architecture of the bearer service in the network system including the relay.

FIG. 6 shows one example of the architecture of the bearer service in the network system including the relay.

The EPS bearer is defined between the UE and the P-GW. In more detail, the Uu radio bearer (UuRB) is defined between the UE and the RN, the Un radio bearer (UnRB) is defined between the RN and the DBS, and the S1 bearer is defined between the DBS and the S-GW. The UuRB may be defined as the conventional RB between UE-BS.

In order for the RN to provide services to the UE from the DBS, it is necessary to map the UnRB from/to the UuRB. It has not yet been discussed what mapping relationship the UnRB and the UuRB have.

Figure 7:
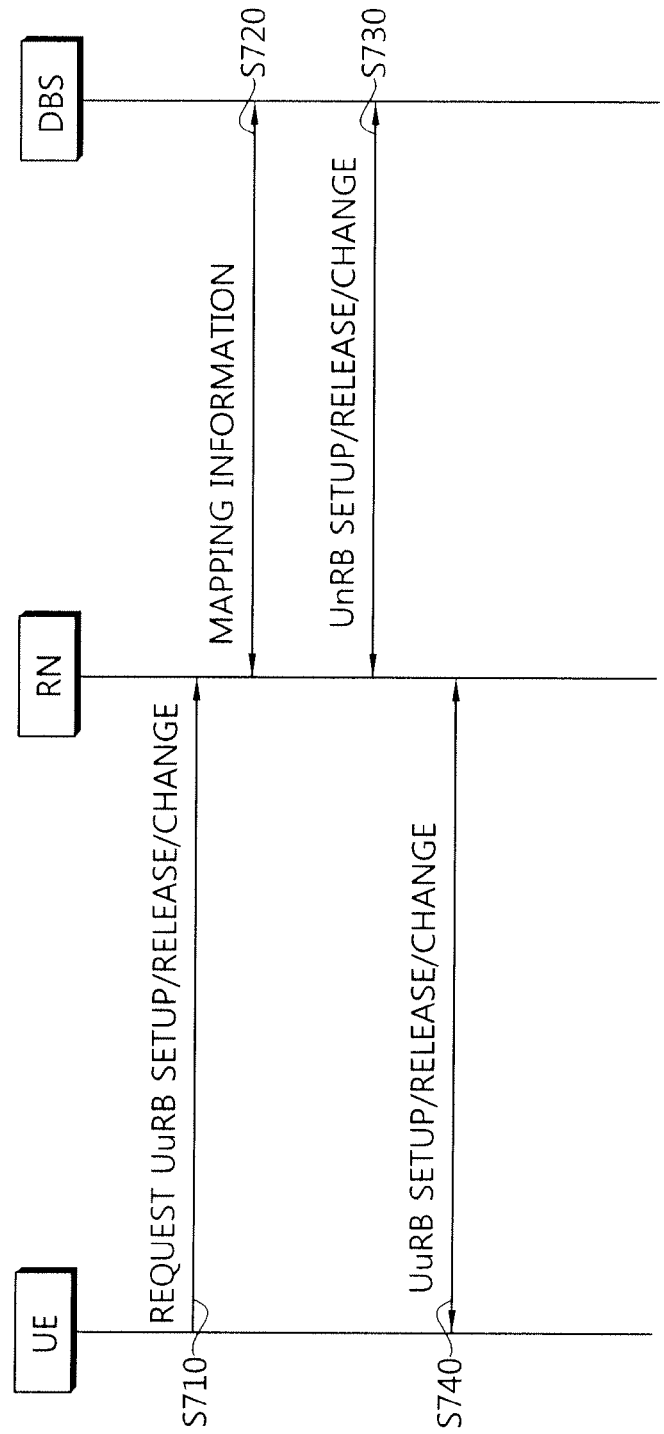
FIG. 7 is a flow chart showing an RB managing method according to an embodiment of the present invention.

FIG. 7 is a flow chart showing an RB managing method according to an embodiment of the present invention.

A RN receives from a UE a request for at least one of the setup, release, and change of the UuRB (S710).

The mapping information on the mapping relationship between the UuRB and UnRB is shared between the RN and the DBS (S720). The mapping information may represent the information on the RB that is setup/released/changed or show the information on all the RBs.

As one example, the RN can inform the base station of the mapping information. When the UuRB is setup/released/changed, the RN sets up/releases/changes the corresponding UnRB. The RN informs the DBS of the mapping information of the UnRB corresponding to the UuRB.

As another example, the RN may receive the mapping information from the DBS. When the UuRB is setup/released/changed, the RN sets up/releases/changes the corresponding UnRB based on the mapping information. The RN can inform the DBS of the information on the UuRB and/or the UnRB that is setup/released/changed.

The UnRB is setup/released/changed between the RN and the DBS (S730). The UuRB corresponding to the UnRB is setup/released/changed between the RN and the UE based on the mapping information. The sequence of the setup/release/change of the UnRB and the setup/release/change of the corresponding UuRB is not limited and therefore, the UuRB may first be setup/released/changed.

Various embodiments for the RB mapping between the UuRB and the UnRB will now be described.

The following matters needs to consider when the RB mapping between the UuRB and the UnRB is performed. First, the RN, which is a network node, has a complex form that is connected to the DBS through a wireless channel while managing several UEs through the wireless channel. The number of UEs (or the number of UuRB) managed by the RN and the number of UnRBs configured by the RN may be different for each RN. Second, the channel state of the Uu interface and the channel state of the Un interface may be different from each other. The reason is that the RN is fixed or has low mobility, but the UE has relatively higher mobility.

Figure 8:
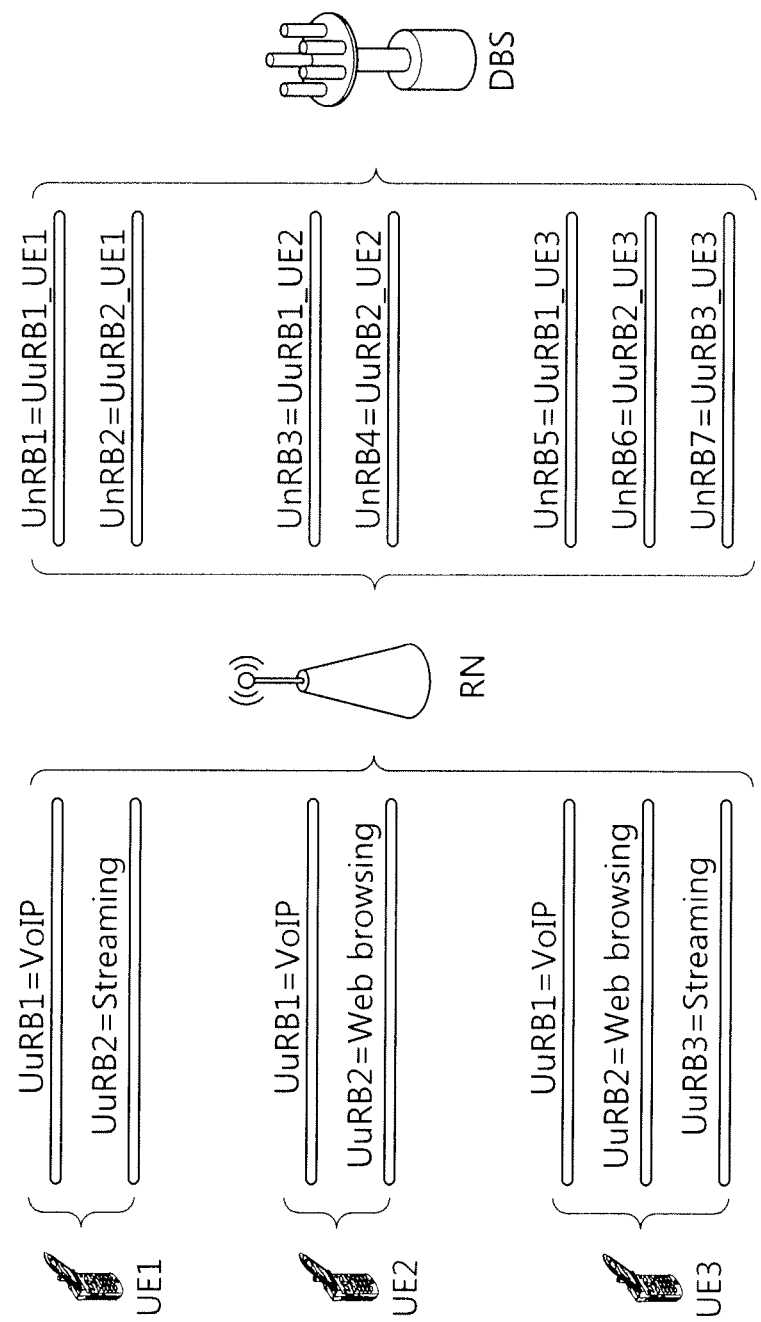
FIG. 8 is a diagram showing one example of the RB mapping.

FIG. 8 is a diagram showing one example of the RB mapping. The UuRB and the UnRB have one-to-one mapping, which is called one-to-one bearer mapping.

When the UuRB is setup in the UE-RN to provide any services, the UnRB mapped to the UuRB is setup in the RN-DBS via the Un interface. Therefore, the total number of UuRBs at the Uu interface is equal to the total number of UnRBs at the Un interface.

Referring to FIG. 8, the RN manages three UEs, UE1, UE2, and UE3 and the UuRB is setup according to quality of service (QoS). The QoS may be defined by using data rate, error rate, delay, etc.

UuRB1 for voice over IP (VoIP) is setup between the UE1 and the RN and UuRB 2 for streaming is setup therebetween. The UuRB1 for VoIP is setup between the UE2 and the RN and the UuRB 2 for web browsing is setup therebetween. The UuRB1 for VoIP is setup between the UE3 and the RN and the UuRB2 for web browsing and streaming is setup therebetween.

One UnRB is setup for each UuRB of each UE. The UuRB1 and UuRB2 of the UE1 are respectively mapped to the UnRB1 and the UnRB2. The UuRB1 and UuRB2 of the UE2 are respectively mapped to UnRB3 and UnRB4. The UuRB1, UuRB2, and UuRB3 of the UE3 are respectively mapped to UnRB5, UnRB6, and UnRB7.

The mapping information representing the mapping relationship between the UnRB and the UuRB may be shown in the following mapping table.

TABLE 1

| UnRB | UE | UuRB |
|------|-----|------|
| 1 | 1 | 1 |
| 2 | 1 | 2 |
| 3 | 2 | 1 |
| 4 | 2 | 2 |
| 5 | 3 | 1 |
| 6 | 3 | 2 |
| 7 | 3 | 3 |

When the RN and the DBS share the mapping relationship between the UnRB and the UuRB, the data packets transmitted through the UnRB do not need any identifier for the UE or any identifier for the UuRB. The reason is that when the RN (or DBS) receives the data packets through the specific UnRB, the RN can identify the UE and the UuRB to which the data packets will be transmitted based on the mapping information. For example, when the RN receives a data packet from the BS through the UnRB3, the RN can identify that the data packet is transmitted to the UE2 through the UuRB1 for VoIP.

However, the RN and the DBS may not share the mapping information. That is, the RN and/or the DBS do not know which UuRB is mapped to any UnRB. If the RN and the DBS do not share the mapping information, when the data packets are transmitted/received through the specific UnRB, identification information is needed to inform whether a data packet belong to a UuRB of a UE. For example, the identification information may be represented as an identifier of a UE (UE ID) and an RB ID that are included in the data packet. In the 3GPP, since a GPRS tunneling protocol (GTP)-ID is uniquely used for each RB of each UE, one unique identifier, e.g. the GTP-ID, may be used as the identification information instead of the UE ID and the RB ID.

Figure 9:
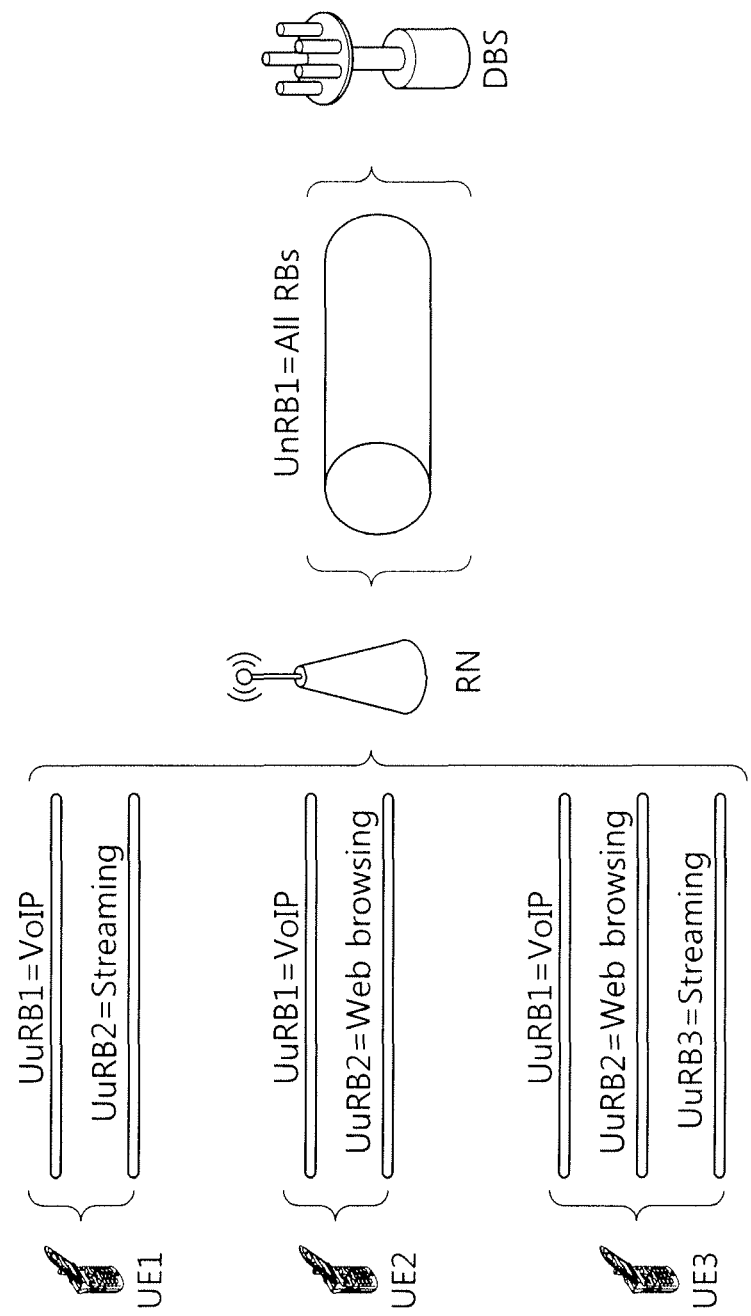
FIG. 9 is a diagram showing another example of the RB mapping.

FIG. 9 is a diagram showing another example of the RB mapping. This shows that the UuRBs of all the UEs are mapped to one UnRB, which is called all-to-one bearer mapping.

If the number of UEs and the number of UuRBs, which are managed by the RN, is not many, the RN sets up only a single UnRB and can thus transmit data packets of all the RB of all the UEs to the DBS through the single UnRB.

Since this method sets up the single UnRB per the RN, the radio resources such as code, time, frequency that are used at the Un interface can be saved. Further, in order to setup the UnRB, the radio protocol layers such as PHY/MAC/RLC/PDCP layers, etc. should be setup. However, since this method sets up only the single UnRB, the number of radio protocol layers managed by the RN is reduced, and the processing of the RN can be simplified.

Since data packets of all the RBs are transmitted through the single UnRB, it is not necessary to include identification information in all the data packets transmitted through the UnRB in order to identify the data packets. The identification information may use one unique identifier such as the GTP-ID and both the UE ID and the RB ID.

According to the all-to-one bearer mapping, the data packets of several UuRBs having different QoS are transmitted through the single UnRB. Each of the radio protocol layers such as the PHY/MAC/RLC/PDCP of the RN and the DBS identifies whether the data packets belong to any UuRB of any UE based on the identification information of the data packets. Further, QoS for each UuRB is supported.

Figure 10:
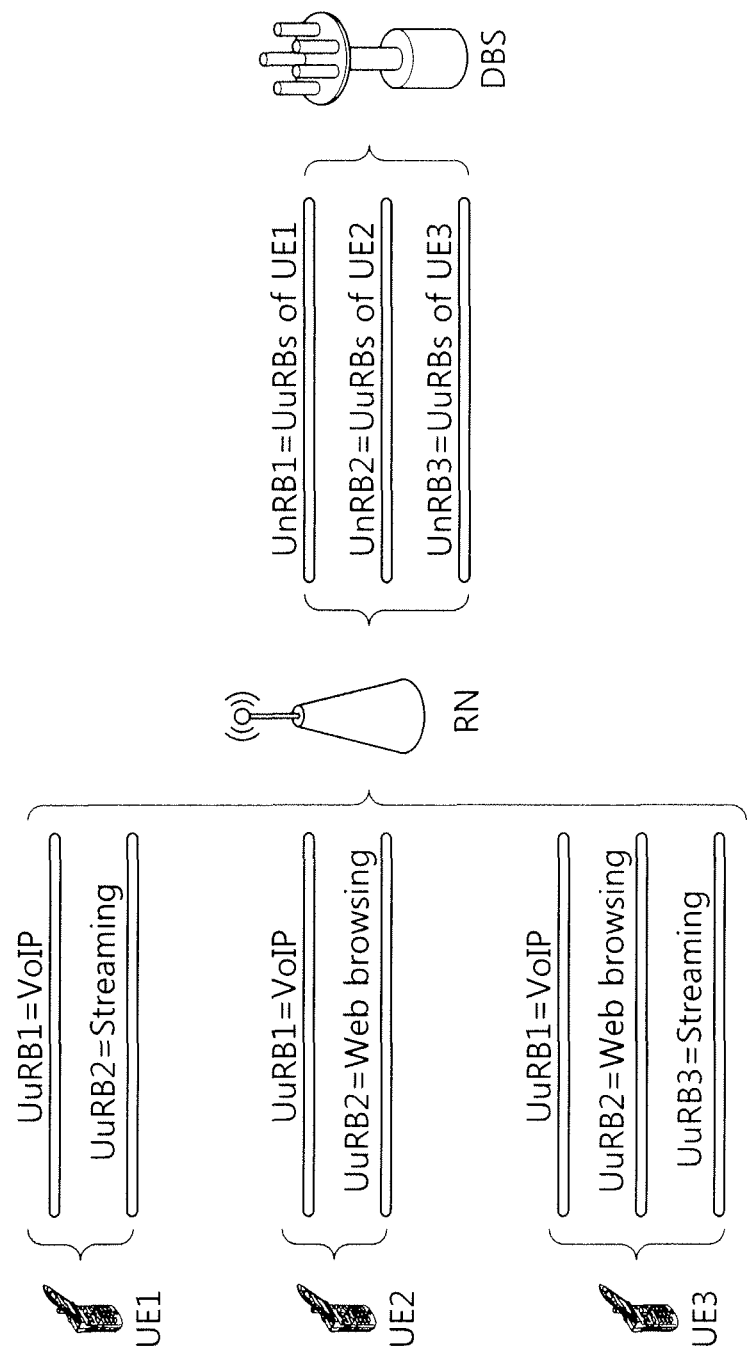
FIG. 10 is a diagram showing another example of the RB mapping.

FIG. 10 is a diagram showing another example of the RB mapping. This is a method of setting up a UnRB per the UE managed by the RN, which is called per-UE bearer mapping.

Since one UnRB is setup for one UE, all the UuRBs of one UE is mapped to one UnRB independently of the guaranteed QoS. The number of UnRBs is equal to the number of UEs managed by the RN.

The RN and the DBS share the mapping information between the UE-UnRB. The mapping information may be shared between the RN and the DeNB via the RRC signaling. The mapping information can be updated when any UE first sets up the UuRB or releases the UuRB.

The RN or the DBS can know from the mapping information whether the data packets transmitted through the specific UnRB belong to any UE. Therefore, it is not necessary to include the identification information for identifying the UE in the data packets. However, since the data packets of all the UuRB of one UE are multiplexed and then transmitted through one UnRB, the identification information for identifying the UuRB, e.g. RB ID. is needed.

However, the RN and the DBS may not share the RB mapping information. That is, the RN and/or the DBS do not know which UuRB is mapped to which UnRB. If the RN and the DBS do not share the mapping information, when the data packets are transmitted or received through the specific UnRB, the identification information is needed to inform whether the data packets belong to any UuRB of any UE. For example, the identification information may be represented as a UE ID and an RB ID that are included for each data packet. In the 3GPP, since a GTP-ID is uniquely used for each RB of each UE, one unique identifier, e.g. the GTP-ID, may be used as the identification information instead of the UE ID and the RB ID.

Figure 11:
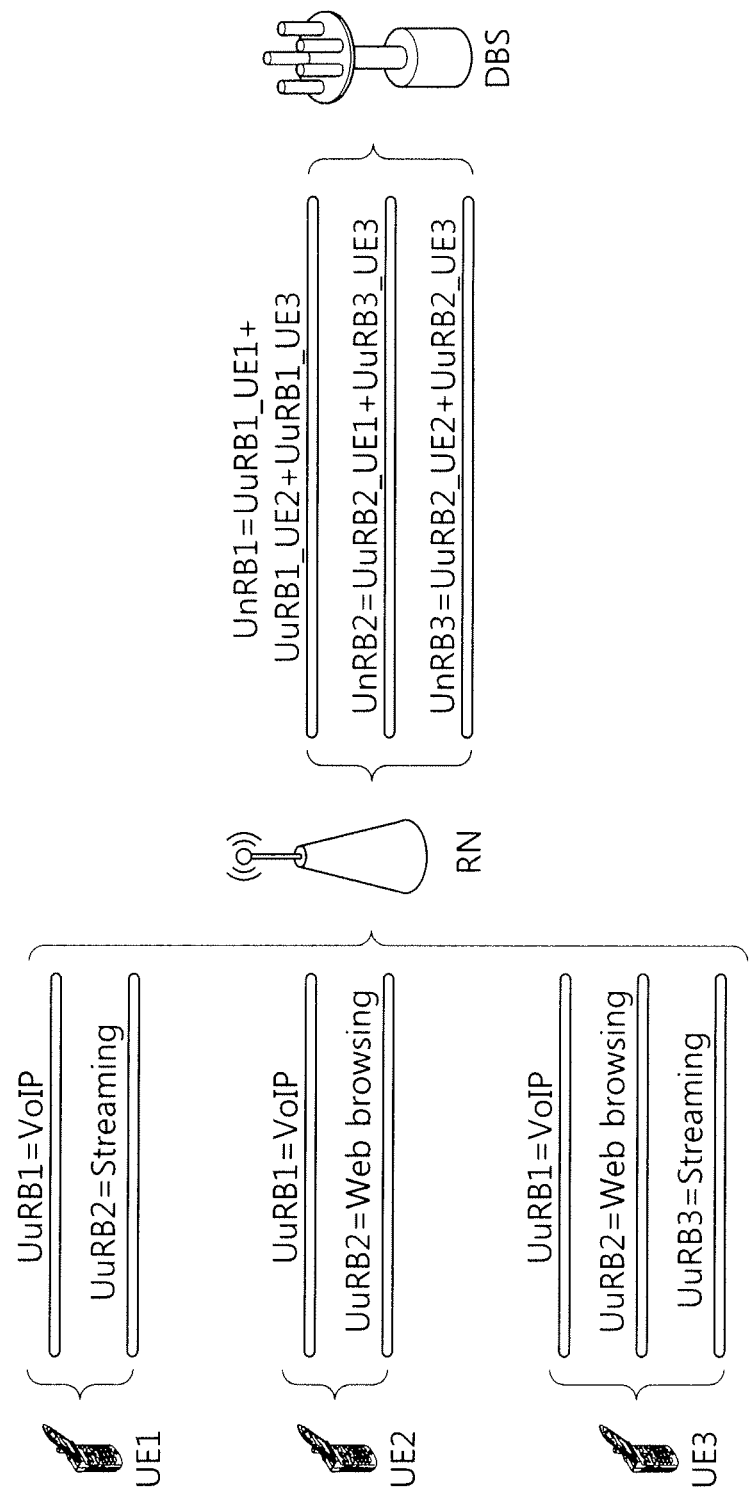
FIG. 11 is a diagram showing another example of the RB mapping.

FIG. 11 is a diagram showing another example of the RB mapping. This sets up the UnRB between the RN and the DBS according to QoS. The method of mapping the UnRBs having the same or similar QoS to the UnRB independently of the UE is called per-QoS bearer mapping. When the identifier representing the QoS of the UuRB or the UnRB is called as a QoS class identifier (QCI), this method may be called per-QCI bearer mapping.

Since one UnRB guarantees one QoS, the UuRB setup between the UE and the RN is mapped to the specific UnRB according to the characteristic of the QoS independently of the UE. The UuRBs having the same guaranteed QoS among the plurality of UuRBs of the plurality of UEs are mapped to a UnRB and the UuRBs having different guaranteed QoS are mapped to different UnRBs.

Since several UuRBs are multiplexed and then transmitted to one UnRB, a data packet transmitted through the UnRB may include a UE ID identifying a UE and a RB ID identifying the RB for the UE. At this time, the UE ID and the RB ID may be replaced by one unique identifier, e.g. the GTP-ID.

In the example of FIG. 11, UuRB1_UE1, UuRB1_UE2, and UuRB1_UE3 having same QoS for the VoIP are mapped to the UnRB1. UuRB2_UE1 and UuRB3_UE3 having same QoS for streaming are mapped to the UnRB2. UuRB2_UE2 and UuRB2_UE3 having same QoS for web browsing are mapped to the UnRB3. Since each UnRB has unique QoS supported by its own, the number of UnRBs setup in the RN-DBS is equal to the number of QoSs supported in the RN-DBS.

When the number of UuRB having the same QoS is large, the radio resource to transmit the multiplexed data packets through one UnRB may not be sufficient. In this case, the UuRB having the same QoS may be mapped to different UnRBs. On the other hand, when the radio resource of one UnRB is sufficient, one UnRB may support several similar QoSs. The UuRBs having similar QoS are mapped to one UnRB.

The mapping between UuRB-UnRB according to the QoS does not have the fixed mapping relationship, but may be variably setup according to the radio conditions and the RB conditions.

The mapping information on the UuRB and the UnRB may be shared between the RN and the DBS through the RRC signaling. The RN may inform the DBS of the mapping information on the UuRB and the UnRB. Alternatively, the DBS may inform the RN of the mapping information on the UuRB and the UnRB. The mapping information may include the information on the changed RB mapping and the mapping information on all the RBs.

The mapping information representing the mapping relationship between the UnRB and the UuRB may be shown in the following mapping table.

TABLE 2

| QoS | UnRB | UE | UuRB |
|---|---|---|---|
| VoIP | 1 | 1 | 1 |
|  |  | 2 | 1 |
|  |  | 3 | 1 |
| Streaming | 2 | 1 | 2 |
|  |  | 3 | 3 |
|  |  | 2 | 2 |
| Web browsing | 3 | 3 | 2 |

The mapping table may be used to determine whether the DBS sets up, changes, or releases any UnRB when any UuRB is setup, changed, or released in the UE.

When the UE requests the setup of any UuRB, the RN or the DBS performs the setup process of the UnRB. The RN or the DBS sets up the UnRB according to the QoS of the UuRB requested by the UE. The mapping information between the UuRB and the UnRB may be shared between the RN and the DBS via the RRC signaling.

When the UE requests the change of a UuRB, the RN or the DBS can map the UuRB to a UnRB according to the QoS of the UuRB or generate new UnRB.

When the UE requests the release of a UuRB, the RN or the DBS can release a UnRB if only the UnRB is mapped to the UnRB corresponding to the UnRB. Further, the RN or the DBS can release the mapping of the UuRB if different UuRBs are also mapped to the UnRB corresponding to the UuRB to be released.

Since the UuRB having the same QoS is multiplexed and then transmitted to one UnRB, a data packet transmitted through the UnRB need the identification information informing whether the data packet belong to any UuRB of any UE. For example, the identification information may be represented as a UE ID and an RB ID that are included for each data packet. In the 3GPP, since a GTP-ID is uniquely used for each RB of each UE, one unique identifier, e.g. the GTP-ID, may be used as the identification information instead of the UE ID and the RB ID.

Figure 12:
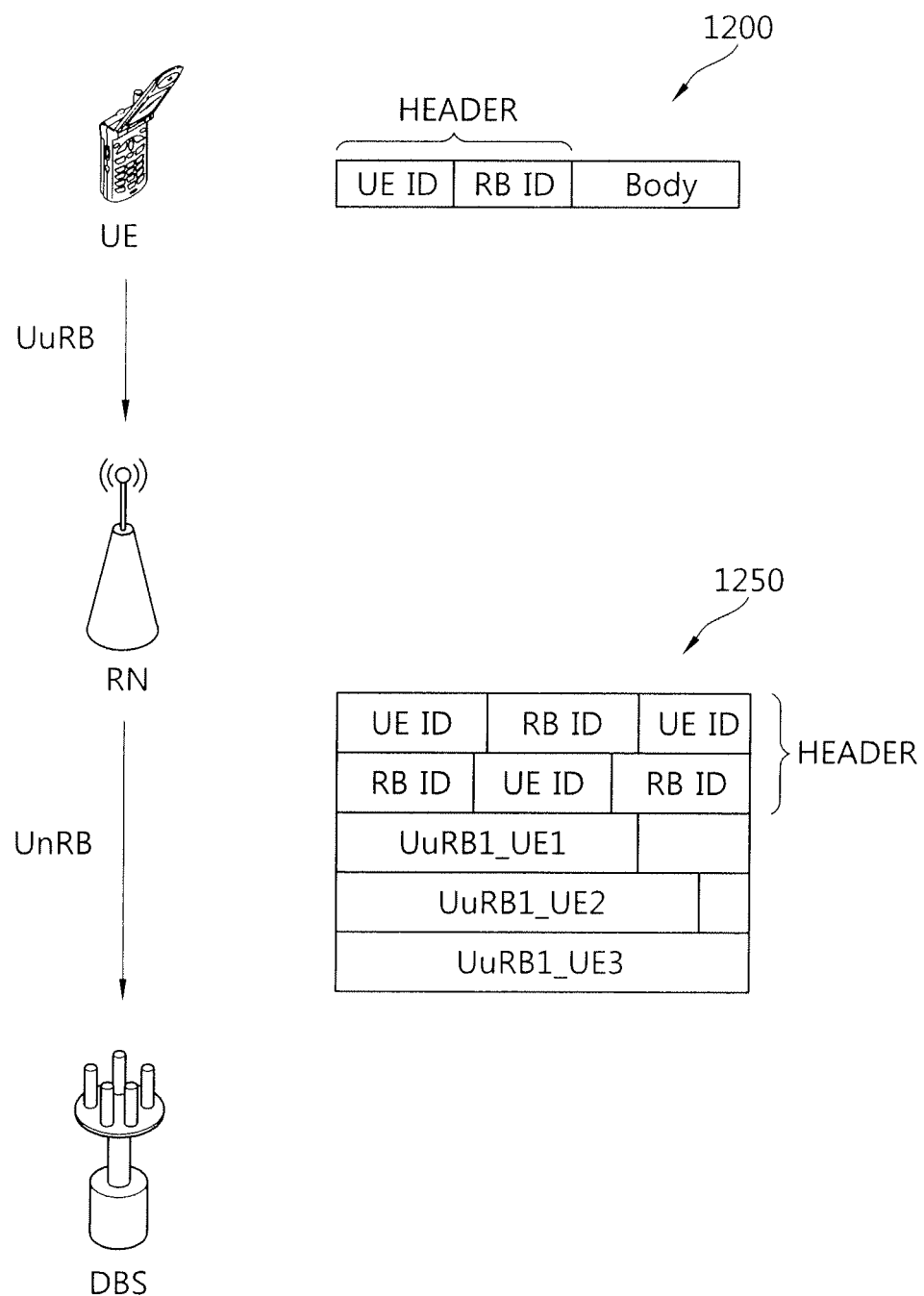
FIG. 12 is a diagram showing one example of constructing data packets for implementing the exemplary embodiments of the present invention.

FIG. 12 is a diagram showing one example of configuring a data packet for implementing the exemplary embodiments of the present invention.

A UE transmits a Uu data packet 1200 through the UuRB. The Uu data packet 1200 includes a header and a body. The body includes a traffic data of the UE. The header may include identification information identifying the UE and the UuRB. More specifically, the header may include a UE ID and a RB ID. If the RN can identify the Uu data packet without the identification information, the Uu data packet may not include the UE ID and the RB ID.

The RN which receives the Uu data packet 1200 transmits a Un data packet 1250 to the DBS through the UnRB corresponding to the UuRB. The Un data packet 1250 may be multiplexed with Uu data packets for the plurality of UEs. The header of the Un data packet 1250 include information which can allow the DBS to identify each of the Uu data packets. The header of the Un data packet 1250 may include the UE ID and the RB ID of each Uu data packet.

Although the data transmission from the UE to the DBS is described herein, the present invention can also be applied to the case of the data transmission from the DBS to the UE.

As the identification information identifying or representing the data packet, various information may be used, including the UE ID and/or the RB ID. For example, one unique identifier representing the UE and the RB such as the GTP-ID may be used.

Data packets of several UuRBs are multiplexed into a data packet of a UnRB in the remaining methods except for the one-to-one bearer mapping among the foregoing four methods. Therefore, the RN and the DBS need the multiplexing/demultiplexing functions for the data packets of several RBs.

The functional entity performing the multiplexing/demultiplexing may be changed according to where the data packets are generated.

Figure 13:
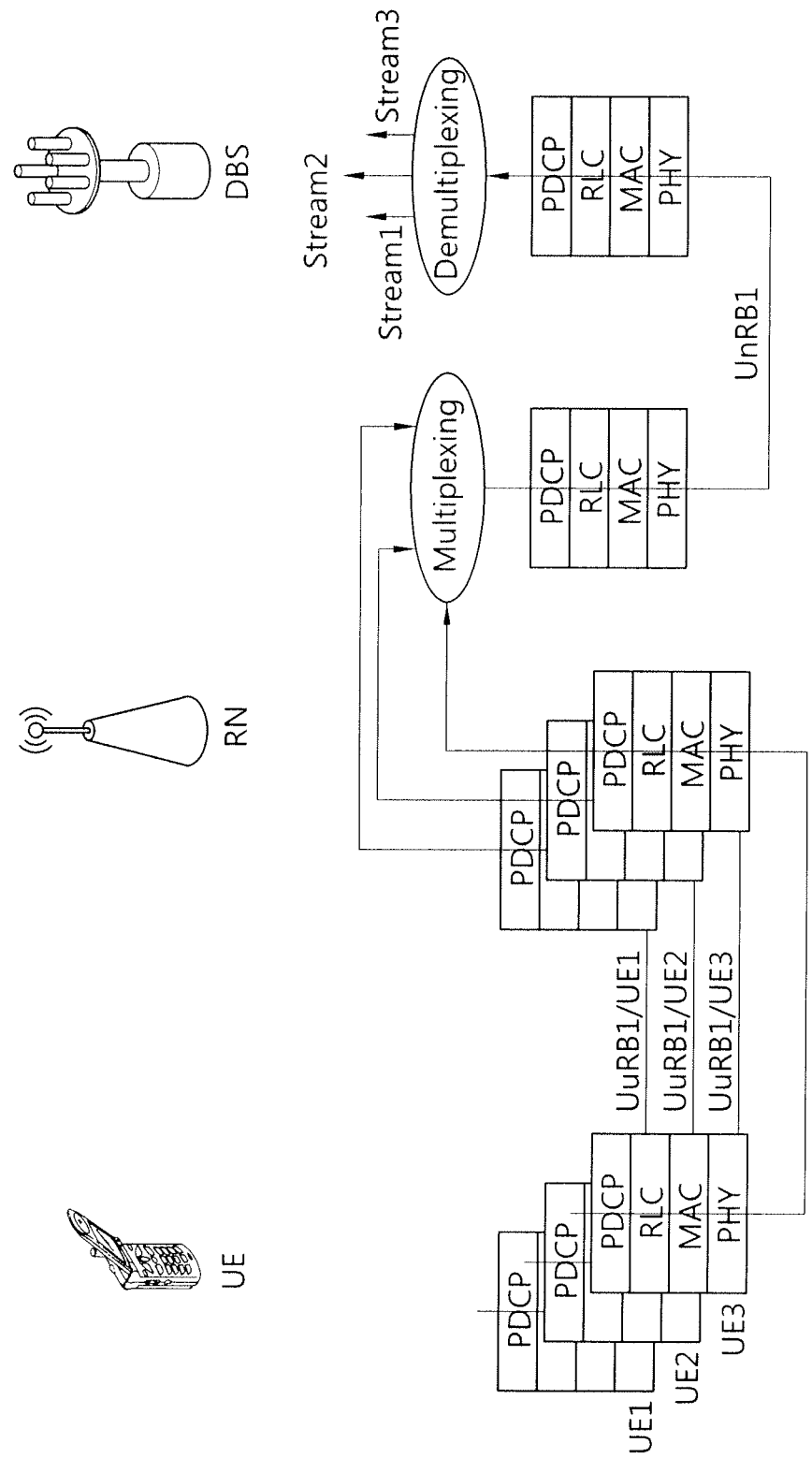
FIG. 13 is a diagram showing multiplexing/demultiplexing of a PDCP SDU.

FIG. 13 is a diagram multiplexing/demultiplexing of a PDCP SDU. A PDCP SDU may be a data block provided from the upper entity, for example, an internet protocol (IP) packet. Therefore, the multiplexing/demultiplexing of the data packets are performed in the upper entity of the PDCP layer.

Figure 14:
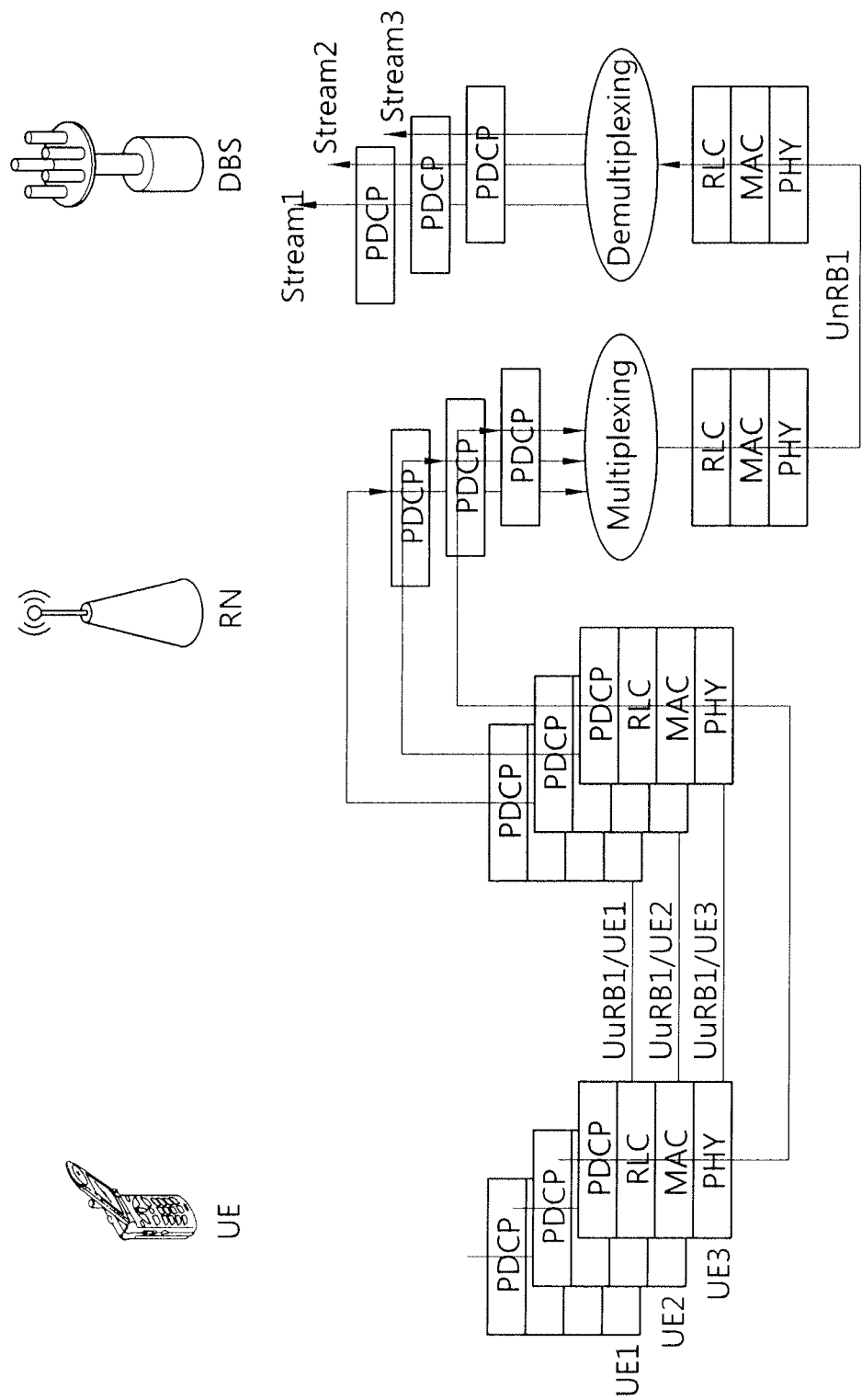
FIG. 14 is a diagram showing multiplexing/demultiplexing of an RLC SDU.

FIG. 14 is a diagram showing multiplexing/demultiplexing of an RLC SDU. The RLC SDU is a data block provided from the upper entity of the RLC layer. When the RLC SDU corresponds to the PDCP PDU, the multiplexing/demultiplexing of the data packets are performed in the PDCP layer. The PDCP layer of the transmitter adds the identification information to the PDCP SDU, thereby generating the PDCP PDU. The PDCP layer of the receiver deletes the identification information from the received PDCP PDU, thereby reproducing the PDCP SDU.

Figure 15:
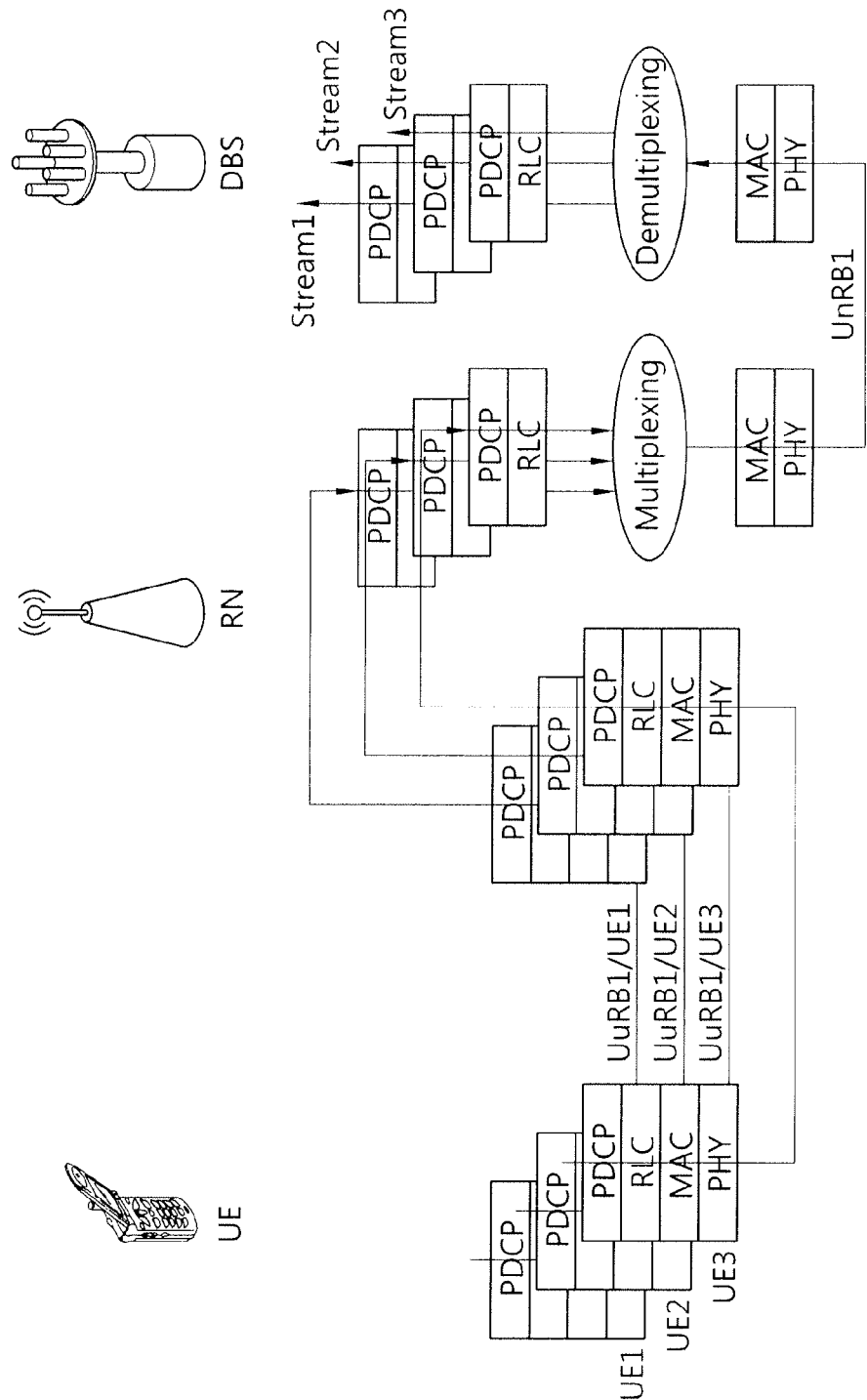
FIG. 15 is a diagram showing multiplexing/demultiplexing of an MAC SDU.

FIG. 15 is a diagram showing multiplexing/demultiplexing of an MAC SDU. The MAC SDU is a data block provided from the upper layer of the MAC layer. When the MAC SDU corresponds to the RLC PDU, the multiplexing/demultiplexing of the data packets are performed in the RLC layer. The RLC layer of the transmitter adds the identification information to the RLC SDU, thereby generating the RLC PDU. The RLC layer of the receiver deletes the identification information from the received RLC PDU, thereby reproducing the RLC SDU.

Although the embodiments of FIGS. 13 to 15 exemplarily show the data transmission from the UE to the DBS, the present invention can also be applied to the case of the data transmission from the DBS to the UE.

The multiplexing unit is a functional entity that multiplexes a data packet of the UuRB into a data packet of the UnRB. The demultiplexing unit is a functional entity that demultiplexes a data packet of the UnRB into a data packet of the UuRB. The multiplexing unit and/or the demultiplexing unit may be included as a part of the Un protocol (for example, any one of an RLC layer, a PDCP layer, and an upper entity of a PDCP layer) and may exist as an independent functional block separate from the Un protocol.

The multiplexing unit and the demultiplexing unit may perform the function of identifying each data packet. For example, a data packet transmitted through the UnRB may include a UE ID and a RB ID in the per-QoS bearer mapping or the all-to-one bearer mapping. Therefore, the multiplexing unit adds the UE ID and the RB ID to the data packet of the UnRB. The demultiplexing unit deletes the UE ID and the RB ID in the received data packet of the UnRB. Since the UE ID is not needed in the per-UE bearer mapping, the multiplexing unit adds the RB ID to the data packet and the demultiplexing unit deletes the RB ID in the received data packet.

Figure 16:
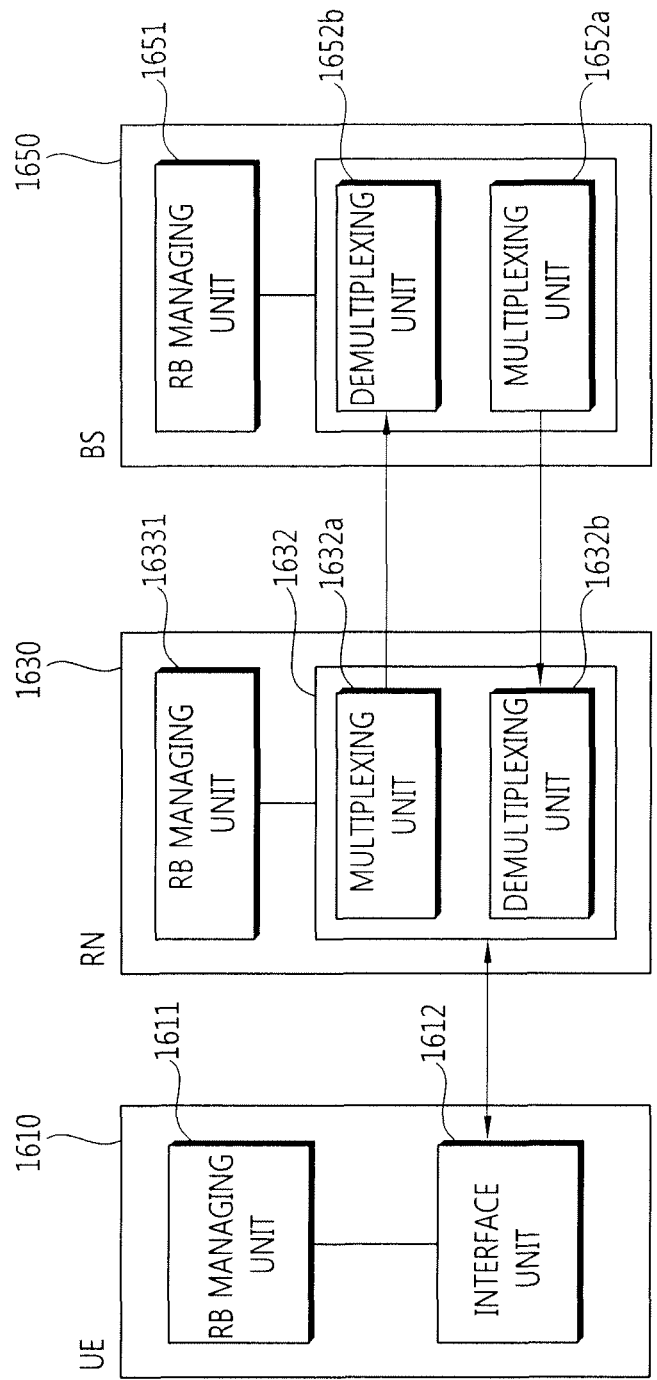
FIG. 16 is a block diagram showing a wireless communication system implementing the exemplary embodiments of the present invention.

FIG. 16 is a block diagram showing a wireless communication system implementing the exemplary embodiments of the present invention. The wireless communication system includes a UE 1610, an RN 1630, and a BS 1650.

The UE 1610 includes an RB managing unit 1611 and an interface unit 1612. The RB managing unit 1611 implements the management of the RB in the UE 1610 according to the embodiments of FIGS. 7 to 15. The RB managing unit 1611 may setup/release/change the UuRB. The interface unit 1612 provides the Uu interface to the RN 1630.

The RN 1630 includes an RB managing unit 1631 and an interface unit 1632. The interface unit 1632 may include a multiplexing unit 1632a and a demultiplexing unit 1632b. The RB managing unit 1631 implements the management of the RB in the RN 1630 according to the embodiments of FIGS. 7 to 15. The RB managing unit 1631 sets up at least one UuRB for the Uu interface, sets up the UnRB for the Un interface, and performs the mapping between the UnRB and the UuRB. The RB managing unit 1631 may share the mapping information with the BS 1650. The interface unit 1632 provides the Uu interface to the UE 1610 and provides the Un interface to the BS 1650. The multiplexing unit 1632a performs the multiplexing of the data packets and the demultiplexing unit 1632b performs the demultiplexing of the data packets.

The BS 1650 includes an RB managing unit 1651 and an interface unit 1652. The interface unit 1652 may include a multiplexing unit 1652a and a demultiplexing unit 1652b. The RB managing unit 1651 implements the management of the RB in the BS 1650 according to the embodiments of FIGS. 7 to 15. The RB managing unit 1631 sets up the UnRB for the Un interface and sets up the UE 1610 and the RB. The RB managing unit 1651 may share the mapping information with the BS 1630. The interface unit 1652 provides the Uu interface to the RN 1630. The multiplexing unit 1652a performs the multiplexing of the data packets and the demultiplexing unit 1652b performs the demultiplexing of the data packets.

Figure 17:
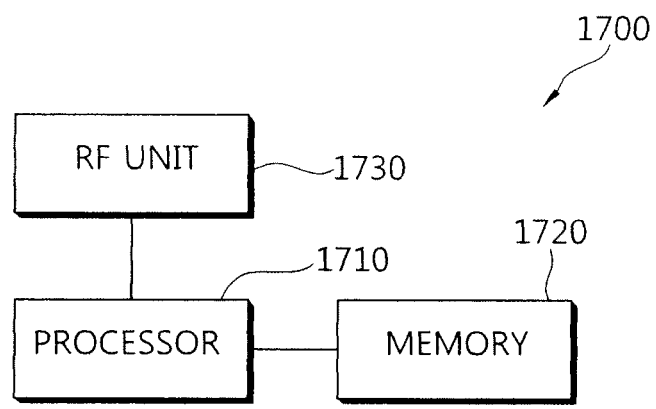
FIG. 17 is a block diagram showing a wireless device implementing the exemplary embodiments of the present invention.

FIG. 17 is a block diagram showing a wireless device implementing the exemplary embodiments of the present invention. A wireless device 1700 may be a part of any one of the UE 1610, the RN 1630, and the BS 1650.

The wireless device 1700 includes a processor 1710, a memory 1720, and a radio frequency (RF) unit 1730.

The processor 1710 implements the RB managing unit and the interface unit of FIG. 16. The memory 1720 stores a radio interface protocol and the radio interface protocol may be implemented by the processor 1710. The RF unit 1730 is operatively connected to the processor 1710 to transmit and/or received radio signals.

The processor 1710 may include application-specific integrated circuit (ASIC), other chipset, logic circuit and/or data processing device. The memory 1720 may include read-only memory (ROM), random access memory (RAM), flash memory, memory card, storage medium and/or other storage device. The RF unit 1730 may include baseband circuitry to process radio frequency signals. When the embodiments are implemented in software, the techniques described herein can be implemented with modules (e.g., procedures, functions, and so on) that perform the functions described herein. The modules can be stored in memory 1720 and executed by processor 1710. The memory 1720 can be implemented within the processor 1010 or external to the processor 1710 in which case those can be communicatively coupled to the processor 1710 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of relaying a data packet by a relay node (RN) in a wireless communication system, the method comprising:
   establishing a plurality of first radio bearers (RBs) over a Uu interface between at least one user equipment (UE) and the RN;
   establishing a second RB over a Un interface between the RN and a donor base station (BS); and
   mapping at least one of the plurality of first RBs to the second RB based on Quality of Services (QoSs) associated with the plurality of first RBs,
   wherein at least two of the plurality of first RBs with similar QoS are mapped to the second RB.

2. The method of claim 1, further comprising:
   receiving the data packet from a serving gateway via the second RB, the data packet including a General Packet Radio Service (GPRS) Tunnelling Protocol (GTP) identifier which identifies one of the plurality of first RBs; and
   transmitting the data packet to the UE via the identified first RB.

3. The method of claim 2, wherein the GTP identifier indicates a GTP tunnel associated with one of the plurality of first RB.

4. The method of claim 1, wherein the RN and the donor BS share mapping information between the plurality of first RBs and the second RB.

5. The method of claim 4, wherein the mapping information is received from the donor BS as the second RB is established.

6. A relay node (RN) comprising:
a radio frequency unit configured to receive and transmit radio signals; and
a processor operativley coupled with the radio frequency unit and configured to:
establish a plurality of first radio bearers (RBs) over a Uu interface between at least one user equipment (UE) and the RN;
establish a second RB over a Un interface between the RN and a donor base station (BS); and
map at least one of the plurality of first RBs to the second RB based on Quality of Services (QoSs) associated with the plurality of first RBs,
wherein at least two of the plurality of first RBs with similar QoS are mapped to the second RB.

7. The RN of claim 6, wherein the processor is further configured to: receive a data packet from a serving gateway via the second RB, the data packet including a General Packet Radio Service (GPRS) Tunnelling Protocol (GTP) identifier which identifies one of the plurality of first RBs; and transmit the data packet to the UE via the identified first RB.

8. The RN of claim 7, wherein the GTP identifier indicates a GTP tunnel associated with one of the plurality of first RB.

9. The RN of claim 6, wherein the RN and the donor BS share mapping information between the plurality of first RBs and the second RB.

10. The RN of claim 9, wherein the mapping information is received from the donor BS as the second RB is established.

* * * * *